United States Patent
Motoyama et al.

[11] Patent Number: 5,436,627
[45] Date of Patent: Jul. 25, 1995

[54] METHOD AND SYSTEM FOR PROCESSING MIXED BINARY LENGTH ENCODINGS CONTAINING DEFINITE AND INDEFINITE LENGTH FORMATS

[75] Inventors: Tetsuro Motoyama, San Jose; Satwinder S. Mangat, Santa Clara, both of Calif.

[73] Assignees: Ricoh Company, Ltd., Tokyo, Japan; Ricoh Corporation, San Jose, Calif.

[21] Appl. No.: 66,383

[22] Filed: May 21, 1993

Related U.S. Application Data

[63] Continuation-in-part of Ser. No. 931,808, Aug. 11, 1992, which is a continuation-in-part of Ser. No. 876,601, Apr. 30, 1992, Pat. No. 5,314,748, and Ser. No. 876,251, Apr. 30, 1992, Pat. No. 5,325,484.

[51] Int. Cl.$^6$ ............................................. H03M 7/40
[52] U.S. Cl. ...................................................... 341/67
[58] Field of Search ..................... 341/67, 81, 82, 59; 375/19; 360/45; 369/59

[56] References Cited

U.S. PATENT DOCUMENTS

| | | |
|---|---|---|
| 4,109,310 | 8/1978 | England et al. |
| 4,175,284 | 11/1979 | Shuraym |
| 4,429,372 | 1/1984 | Berry et al. |
| 4,433,377 | 2/1984 | Eustis et al. |
| 4,443,860 | 4/1984 | Vidalin |
| 4,547,890 | 10/1985 | Gindi ..................................... 375/19 |
| 4,949,303 | 8/1990 | Hoshino et al. |
| 4,967,391 | 10/1990 | Iijima |
| 4,991,078 | 2/1991 | Wilhelm et al. |
| 5,029,069 | 7/1991 | Sakamura |
| 5,077,659 | 12/1991 | Nagata |

OTHER PUBLICATIONS

ISO/IEC 8824, 2nd Ed., 1990-12-15, Information Technology—Open Systems Interconnection—Specification of Abstract Syntax Notation One (ASN.1).
ISO/IEC 8825, 2nd Ed., 1990-12-15, Information Technology—Open Systems Interconnection—Specification of Basic Encoding Rules for Abstract Syntax Notation One (ASN.1).
ISO/IEC DIS10180, Information Processing—Text Communication—Standard Page Description Language Draft International Standard 1991-03, 1991.

*Primary Examiner*—Brian K. Young
*Attorney, Agent, or Firm*—Oblon, Spivak, McClelland, Maier, & Neustadt

[57] ABSTRACT

A method and apparatus for processing binary mixed indefinite and definite length encodings. The length of a definite length encoding is stated at the beginning of the encoding whereas for an indefinite length encoding, the length is unknown. The present invention processes encodings which contain indefinite length encodings with definite length encodings nested therein by keeping track of the levels of nesting. When a definite length encoding is being processed which is nested within an indefinite length encoding, the end of the indefinite length encoding cannot be searched for as data within the definite length encoding might be identical to the flag or marker which signifies the end of the indefinite length encoding. A stack can be used to keep track of the number of bytes within a definite length encoding which have been processed. As an indefinite length encoding within a definite length encoding is being processed, the stack keeps track of the number of bytes within the indefinite length encoding which have been processed as those bytes within the indefinite length encoding are part of the definite length encoding.

16 Claims, 16 Drawing Sheets

FIG. 1

| | | | |
|---|---|---|---|
| 1 | IDENTIFIER | 1 BYTE | |
| 2 | LENGTH 400 | 2 BYTES DEFINITE | |
| 3 | CONTENTS (400 BYTES CONTENTS) | | |
| 4 |     IDENTIFIER | 2 BYTES | |
| 5 |     LENGTH | 1 BYTE INDEFINITE | |
| 6 |     CONTENTS | | |
| 7 |         IDENTIFIER | 1 BYTE | |
| 8 |         LENGTH 248 | 2 BYTE DEFINITE | |
| 9 |         CONTENTS (248 BYTES CONTENTS) | | |
| 10 |         IDENTIFIER | 1 BYTE | |
| 11 |         LENGTH 40 | 1 BYTE DEFINITE | |
| 12 |         CONTENTS (40 BYTES CONTENTS) | | |
| 13 |     0000H | | |
| 14 |     IDENTIFIER | 1 BYTE | |
| 15 |     LENGTH 100 | 1 BYTE DEFINITE | |
| 16 |     CONTENTS (100 BYTES CONTENTS) | | |
| 17 | IDENTIFIER | 1 BYTE | |
| 18 | LENGTH 250 | 1 BYTE DEFINITE | |
| 19 | CONTENTS (250 BYTES CONTENTS) | | |

| PROCESSING STEP | PROGRAM STEP(S) | FLOW-CHART FIGURE | TOP | INDEF | STACK | |
|---|---|---|---|---|---|---|
| A | 1-3 | 11 | 1 | 0 | 0 | 400 |
| B | 4 | 12 | 1 | 0 | 0 | 398 |
| C | 5 | 12 | 1 | 0 | 0 | 397 |
| D | 5 | 13 | 2 | 1 | INDEF<br>0 | 0<br>397 |
| E | 7 | 12 | 2 | 1 | INDEF<br>0 | -1<br>397 |
| F | 8 | 12 | 2 | 1 | INDEF<br>0 | -3<br>397 |
| G | 8+9 | 14 | 2 | 1 | INDEF<br>0 | -251<br>397 |
| H | 10 | 12 | 2 | 1 | INDEF<br>0 | -252<br>397 |
| I | 11 | 12 | 2 | 1 | INDEF<br>0 | -253<br>397 |

*FIG. 16A*

| PROCESSING STEP | PROGRAM STEP(S) | FLOW-CHART FIGURE | TOP | INDEF | STACK | |
|---|---|---|---|---|---|---|
| J | 11+12 | 14 | 2 | 1 | INDEF<br>0 | -293<br>397 |
| K | 13 | 14 | 2 | 1 | INDEF<br>0 | -293<br>397 |
| L | 13 | 15 | 1 | 0 | INDEF<br>0 | -295<br>397 |
| M | 13 | 15 | 1 | 0 | 0 | 102 |
| N | 13+14 | 14 | 1 | 0 | 0 | 102 |
| O | 14 | 12 | 1 | 0 | 0 | 101 |
| P | 15 | 12 | 1 | 0 | 0 | 100 |
| Q | 15+16 | 14 | 0 | 0 | 0 | 0 |
| R | 17-19 | 11 | 0 | 0 | 0 | 0 |

*FIG. 16B*

METHOD AND SYSTEM FOR PROCESSING MIXED BINARY LENGTH ENCODINGS CONTAINING DEFINITE AND INDEFINITE LENGTH FORMATS

CROSS-REFERENCES TO RELATED APPLICATIONS

This application is a continuation-in-part of U.S. patent application Ser. No. 07/931,808 filed on Aug. 11, 1992 and entitled "A Method and System to Handle Dictionary Generation and Context Declaration in a Document Processing Language" which is a continuation-in-part of U.S. patent application Ser. No. 07/876,601 now U.S. Pat. No. 5,314,748 and Ser. No. 07/876,251 now U.S. Pat. No. 5,325,484 both filed on Apr. 30, 1992 and entitled "Method and Apparatus to Manage Picture and Pageset for Document Processing" and "Method and System to Handle Inclusion of External Files into a Document Processing Language," respectively.

BACKGROUND OF THE INVENTION

1. Field of the Invention

This invention relates generally to processing a document or other type of file which contains an encoding containing both indefinite and definite length formats.

The present invention relates more specifically to processing a file which is binary encoded using ASN.1 according to the Standard Page Description Language (SPDL).

2. Discussion of the Background

Processing systems are known in which a data processor can handle input data elements which are fixed or variable in length. For example, U.S. Pat. No. 4,443,860, issued to Vidalin on Apr. 17, 1984, discloses a system for comparison of variable format input data and stored data. However, this reference does not disclose processing of nested definite and indefinite length formats.

The present invention has been developed to process binary encoded standard page description language (SPDL). SPDL is a proposed page description language (PDL) in the process of being developed as an international standard by several people including one of the inventors herein. The proposal is currently in draft form before a section of the International Standards Organization ("ISO") as ISO/IEC DIS 10180 and is available through the American National Standards Institute ("ANSI") in New York.

SPDL is a hierarchically structured page description language which can be encoded in a clear text format or a binary format. The binary encoding of SPDL is performed according to Abstract Syntax Notation 1 ("ASN.1") as defined in ISO/IEC 8824:1990 and uses the Basic Encoding Rules of ASN.1 as defined in ISO/IEC 8825:1990.

SUMMARY OF THE INVENTION

Accordingly, it is one object of this invention to provide a novel method and apparatus which can process mixed length encoding containing nested definite and indefinite length formats.

It is a further object of this invention to provide a method and apparatus for processing binary SPDL files according to ASN.1 containing mixed definite and indefinite length formats.

These and other objects are accomplished by a method and apparatus for processing mixed binary length encodings. The present invention processes mixed definite and indefinite length encodings by keeping track of the nesting of the encodings and how many bytes within a definite length encoding have been processed.

As a definite length encoding is being processed which is nested within an indefinite length encoding, a flag or marker signifying the end of the indefinite length encoding cannot be searched for as data within the definite length encoding might resemble the flag or marker. Once the definite length encoding is finished, there can be a search for the flag or marker signifying the end of the indefinite length encoding.

The present invention can use a stack to keep track of the nesting of the hierarchical levels of the input data stream. The stack is used to keep track of the number of bytes within a definite length encoding and as the bytes of the definite length encoding are processed, the value in the stack corresponding to the length of the definite length encoding is decremented. Therefore, the entry in the stack, corresponding to the number of bytes of the definite length encoding which have been processed, becomes zero when the entire definite length encoding has been completely processed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 illustrates an example of nesting of definite and indefinite formats;

FIGS. 11A–15 illustrate flow charts used by an embodiment of the present invention to process mixed definite and indefinite length formats in which:

FIGS. 11A and 11B illustrate initializing and processing a first hierarchical level of a document;

FIG. 12 illustrates a procedure which reads identifier and length information of a nested level and determines whether the nested level is primitive or constructed;

FIG. 13 illustrates the processing used to handle a constructed nested routine;

FIG. 14 illustrates the processing performed for handling a primitive routine within a constructed routine;

FIG. 15 illustrates the processing performed when the end of an indefinite level has been detected; and FIGS. 16a and 16b illustrate the variables and stack during the processing of the example in FIG. 1.

DESCRIPTION OF THE PREFERRED EMBODIMENTS

Figure 2:
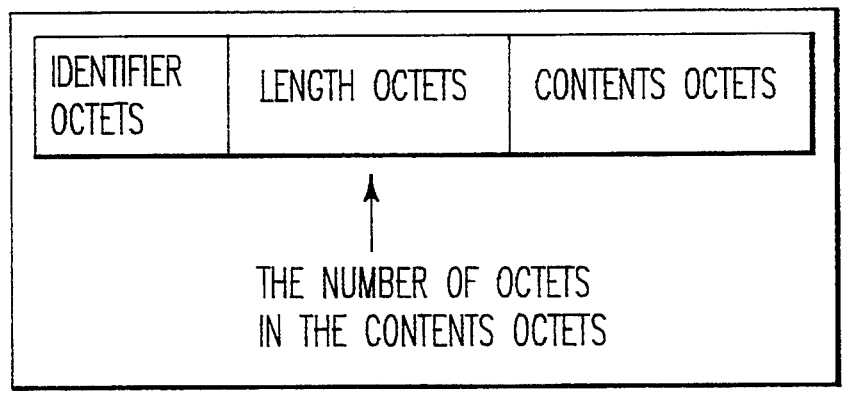
FIG. 2 illustrates the structure of an encoding according to ISO/IEC 8825.

Referring now to the drawings, wherein like reference numerals designate identical or corresponding parts throughout the several views, and more particularly to FIG. 1 thereof, there is illustrated an example of nesting of definite length and indefinite length formats. FIG. 1 can be considered to illustrate a data stream or document data stream which is to be processed. Lines 1–16 and lines 17–19 are two encodings at the higher hierarchical level, although there are nested encodings within lines 1–16. The contents of the encoding of lines 1–16 is of a definite length of 400 bytes. Within those 400 bytes, first there is an indefinite length structure at lines 4–13. Within the indefinite length contents of lines 4–13 are definite length encodings of 248 bytes and 40 bytes. In addition to the indefinite length encoding at lines 4–13 of the 400 bytes of content, there is a definite encoding at lines 14–16 containing 100 bytes of contents. Lines 17–19 of FIG. 1 contain a definite length encoding of 250 bytes of content in length.

The term "nesting of definite length and indefinite length formats" means that an indefinite length encoding can have as its content both an indefinite and a definite length encoding or a combination of these two encodings. This means that the definite length encoding begins before the indefinite length ends. The above term is similarly applicable to a definite length encoding containing an indefinite length encoding therein. That is, an indefinite length encoding can begin before a definite length encoding ends. Further, there can be any number of encodings of any type nested within an encoding.

As an encoding such as that illustrated in FIG. 1 is being process, a problem exists with the handling of the nested definite and indefinite length encodings. The example illustrated in FIG. 1 is a simple case. It is possible for the definite and indefinite format nesting to be much deeper. Therefore, the processing system may have to keep track of the nesting of many indefinite format and definite formats.

To determine the end of an indefinite length encoding, more is required than looking for the end of the indefinite encoding flag or marker such as 0000H of line 13 which is used in ASN.1 encoding. This is because the contents at lines 9 and 12 can contain 0000H as data, for example, as image data. Therefore, the present invention operates to look for the end of the indefinite length encoding, 0000H, after nested definite length encodings have been processed as the end of the indefinite encoding must come after definite length format nested routines.

Turning now to the encoding required by ASN.1, FIG. 2 illustrates the structure of an encoding according to the Basic Encoding Rules as defined in ISO/IEC 8825. The encoding begins with one or more identifier octets, one or more length octets, followed by the contents octets.

Figure 3:
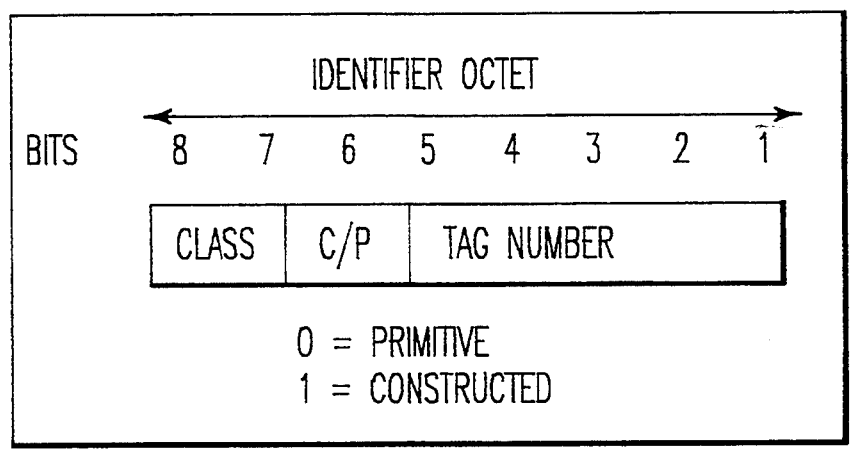
FIG. 3 illustrates the structure of an identifier octet according to ISO/IEC 8825.

The structure of an identifier octet defined by ISO/IEC 8825 is illustrated in FIG. 3. The first two bits of the identifier octet sets forth the class of the encoding. The four possible classes of the encoding defined by bits 8 and 7 illustrated in FIG. 3 are universal, application, context-specific, and private. A complete description of encoding under ASN.1 can be found in ISO/IEC 8824 and 8825, each of which is incorporated herein by reference. However, an understanding of the operation of the present invention does not require an understanding of the different classes of encodings and a more detailed description is omitted for clarity.

Bit 6, illustrated in FIG. 3, determines whether an encoding is primitive or constructed. Primitive means there are no further encodings nested within the content and constructed means that there are further encodings within the content. Bits 1 through 5 illustrated in FIG. 3 pertain to the number of the tag. If tag number is greater than 31, bits 1 through 5 are not sufficient to represent the number and therefore, the tag number is set to 11111 with subsequent octets of the tag having bit 8 set to one, unless it is the last octet. A complete understanding of the various tag numbers is not required to understand the operation of the present invention and is therefore omitted for clarity.

Figure 4:
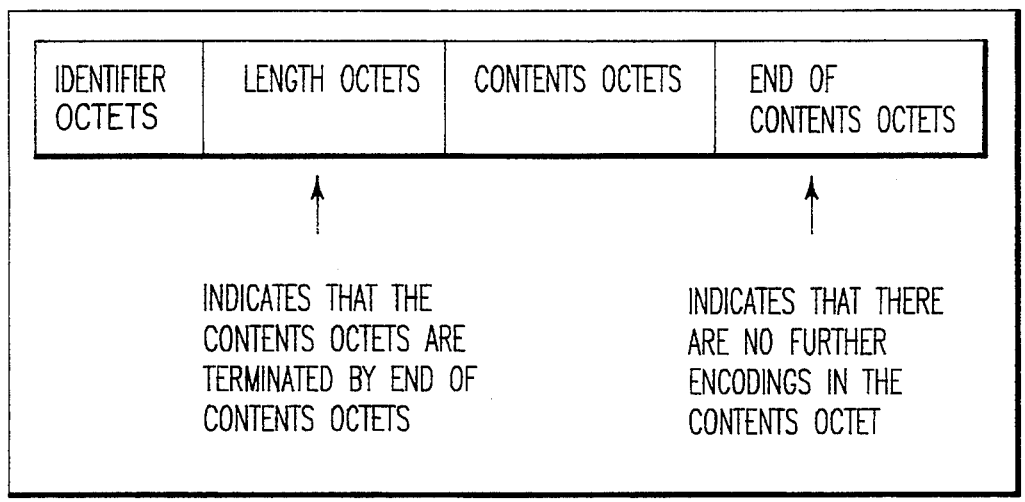
FIG. 4 illustrates an alternatively constructive encoding using an indefinite length format.

FIG. 4 illustrates an indefinite length encoding. In ASN.1, a length octet of an indefinite length encoding is set to 10000000. The end of contents octet is 0000H for indefinite length encoding under ASN.1.

The contents, also referred to as content information, are data which contain commands which can be used to define the parameters of an SPDL document being processed. The identifier and/or length octets are preamble information in that they are used to define information which follows. Note that all information in an encoding after the preamble information of the encoding can be considered to be content information. This means that the marker or flag signifying the end of an indefinite length encoding is considered, for purposes of this writing, as content information of the indefinite length encoding.

Figure 5:
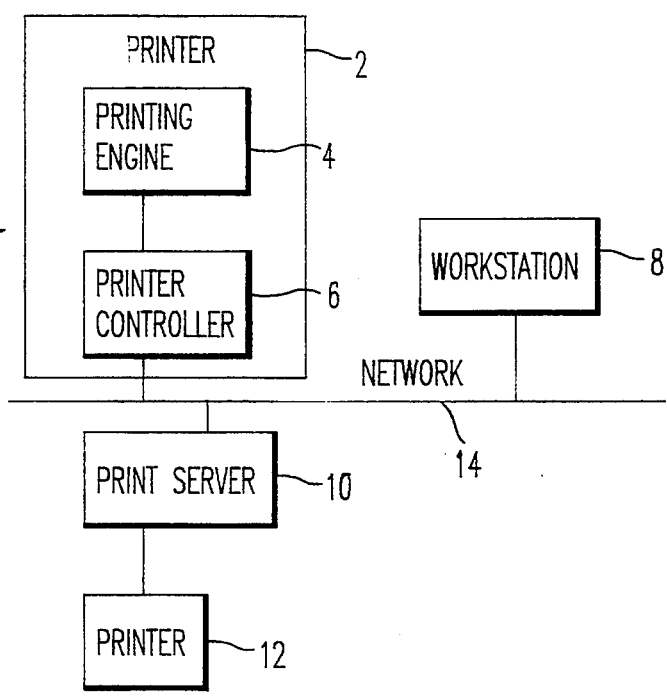
FIG. 5 illustrates a computer network for employing the present invention.

FIG. 5 illustrates a network and various devices connected thereto, any of which can employ the present invention. Connected to the network 14 is a printer 2 having a printer controller 6 and a printing engine 4. Workstation 8 is also connected to the network along with print server 10 connected to printer 12.

Figure 6:
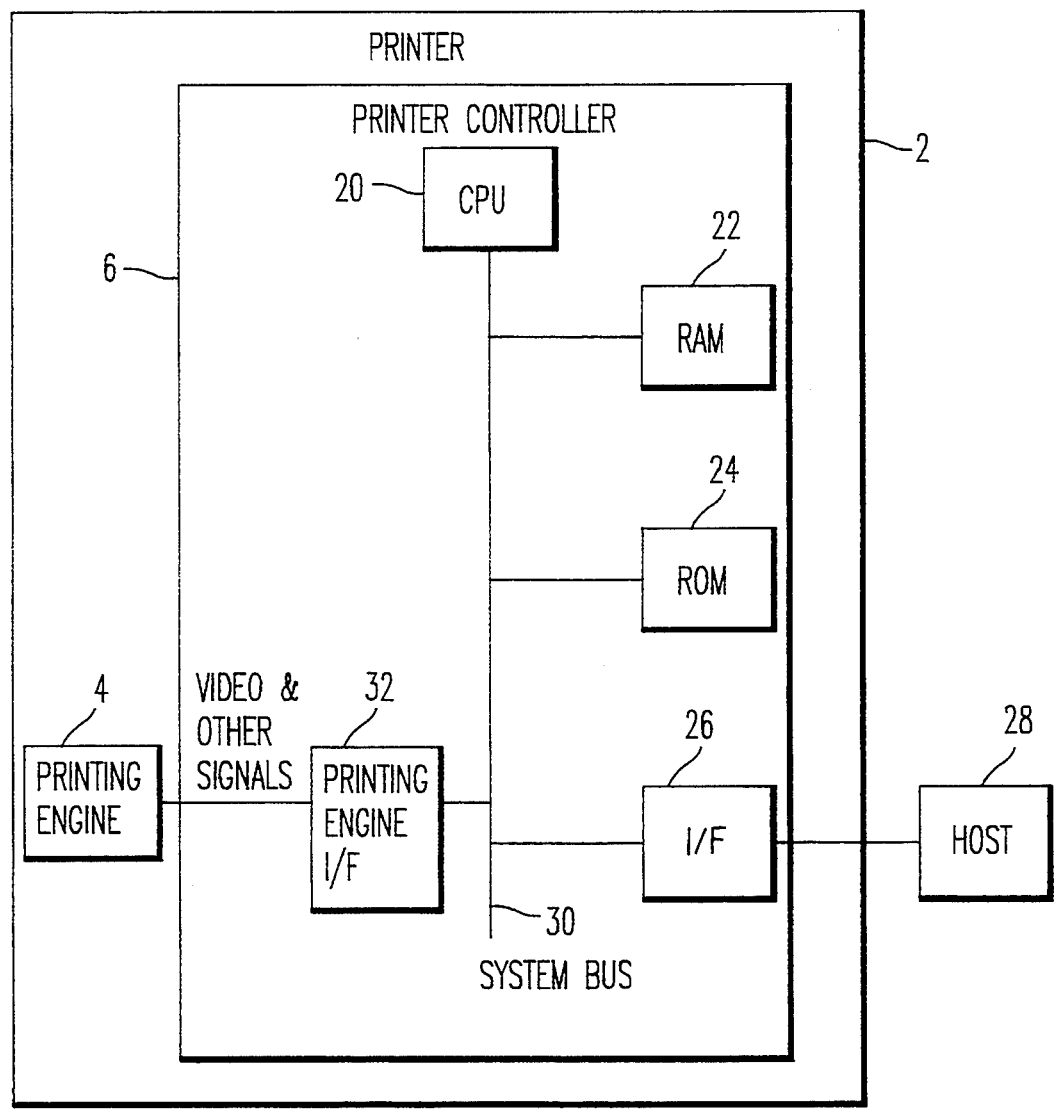
FIG. 6 illustrates a printer controller for embodying the present invention.

FIG. 6 illustrates the details of the printer controller 6 of printer 2. Printer 2 can be, for example, any of the following types: laser printer, inkjet printer, thermal printer, ion deposit printer, LED printer and digital copier. The printer controller is connected to a host 28 through an interface 26. Host 28 can be any computer and could, for example be a workstation 8. The workstation 8 can be connected to host 28 through the network 14, a serial printer cable, or a parallel printer cable, for example. The printer controller also contains a CPU 20, RAM 22, ROM 24 embodying the process of the present invention, a printing engine interface 32, and a system bus 30 connecting the elements of the printer controller. The printing engine interface 32 outputs rasterized image data in the form of video and other control signals to the printer engine 4, and receives status information from the printer engine 4. Signals other than video may be used for a different printing engine 4.

Figure 7:
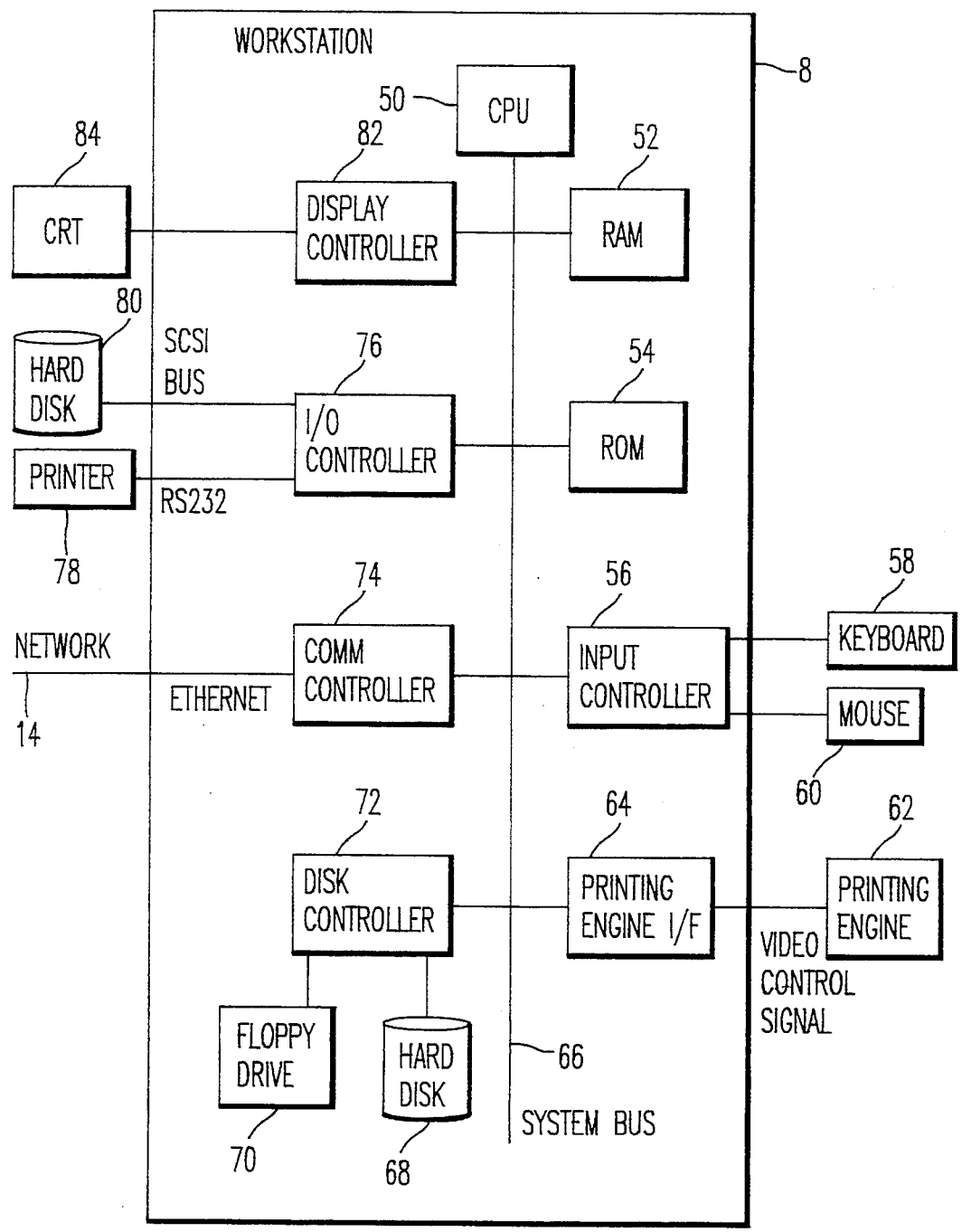
FIG. 7 illustrates a work station for employing the present invention.

FIG. 7 illustrates the makeup of the workstation 8. The workstation 8 contains CPU 50, RAM 52, ROM 54, input controller 56 connected to a keyboard 58 and a mouse 60. A printing engine interface is connected directly to a printing engine 62 which receives video and control signals for rasterized image data transmitted by the printer engine interface 64. The workstation further contains a disk controller 72 connected to a hard disk 68 and floppy drive 70, a communication controller 74 for connection to the network 14 which can be for example, an Ethernet ® network, an I/O controller 76 connected to an external hard disk 80 through an SCSI bus, for example, and a printer 78, connected through an RS232 cable, for example. The workstation also contains a display controller 82 connected to a CRT 84. A system bus 66 connects the elements within the workstation.

An SPDL file to be processed and printed can be directly created by the workstation 8 or can be first created by the workstation 8 and then stored in either of the hard disks 68 or 80, the floppy drive 70 or the RAM 52 for example. The SPDL file can then be processed for printing by the CPU 50 but it might be first necessary to determine whether the SPDL file has been encoded in the clear text or binary format. The process for determining the encoding format of the SPDL file can be stored in the ROM 54, the hard disks 68 or 80, or the RAM 52, for example. Once the encoding format of the SPDL file has been determined, the CPU 50 can process the SPDL file into rasterized image data which is sent through the bus 66 through the printer engine interface 64 and finally to the printing engine 62 in the form of video and control signals so the image data can be printed on the printing engine 62. The video signal is used in the example of a laser printing engine. Other printing engines may require different types of signals.

Figure 8:
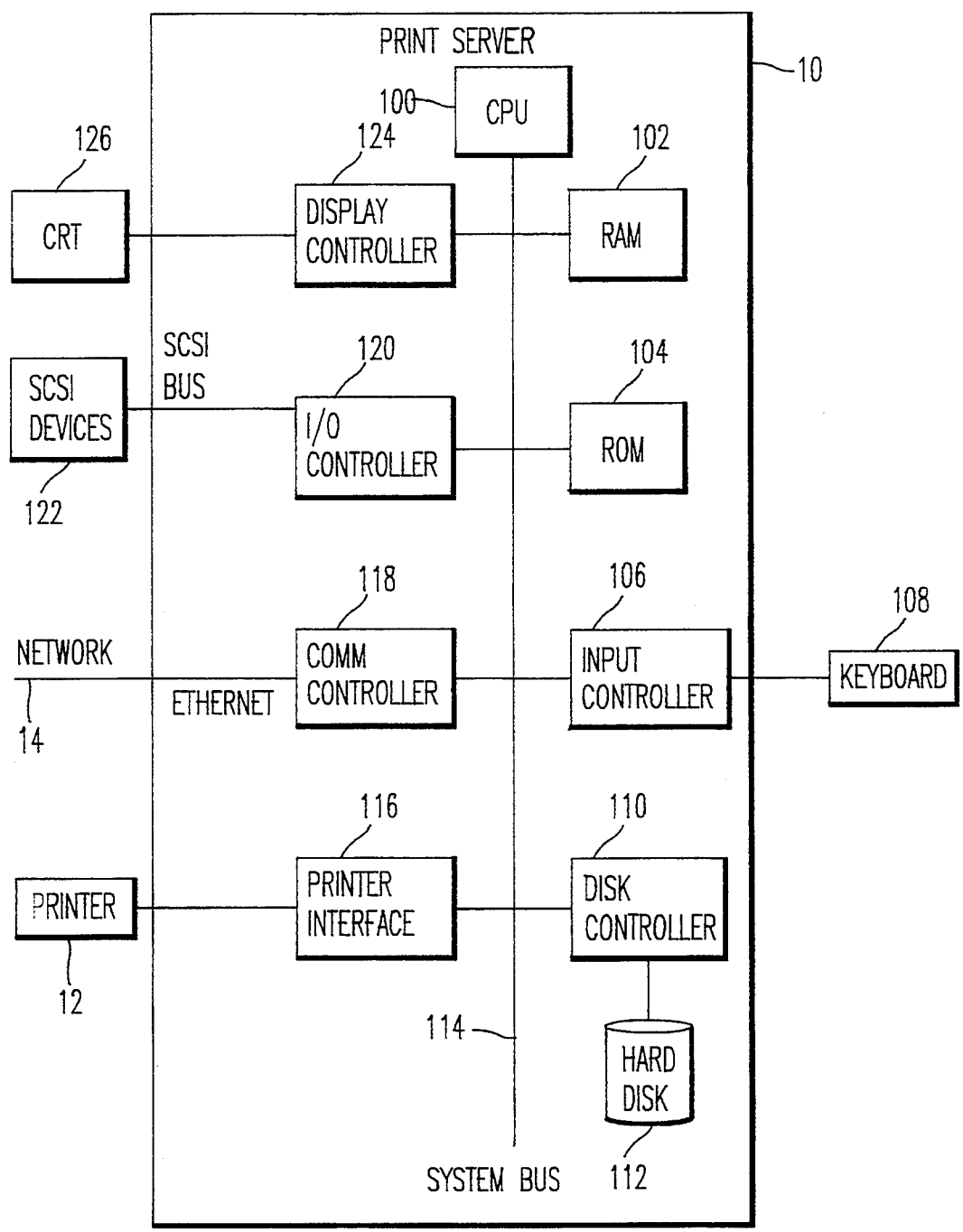
FIG. 8 illustrates a printer server for employing the present invention.

The print server 10, illustrated in FIG. 8, has a basic makeup very similar to workstation 8. The print server 10 receives an SPDL file sent over the network 14 and received by communication controller 118. If the CPU 100 does not know whether the SPDL file is encoded in a binary or clear text format, it must determine the format of the received file using a process such as that described in commonly owned copending U.S. patent application Ser. No. 08/006,416, filed Jan. 19, 1993 and entitled "Method and System to Recognize Encoding Type in Document Processing Language", the disclosure of which is incorporated herein by reference, or some other determination process.

Next, the file is processed by the CPU and sent over system bus 114 to printer interface 116 to printer 12. The CPU 100 can process the document into different formats. For example, the SPDL document can be processed into a PostScript ® representation and transmitted to the printer 12 which would be PostScript compatible. Alternatively, the CPU 100 can process the SPDL file into one of the escape sequence type of languages such as those that are native to the Hewlett Packard Laserjet ® series of printers and therefore, it can be assumed in this circumstance the printer 12 would be HP Laserjet ® compatible. It is also possible for the CPU to process the SPDL document into a format for raster capable printers such as dot matrix, inkjet, or thermal printer, or any other type of raster capable printer. It is also possible that the CPU 100 processes the SPDL file into a raster image, with the raster data then being sent to a printer engine within printer 12. The print server can also direct the printing instruction to a printer at a different location through the network.

Figure 9:
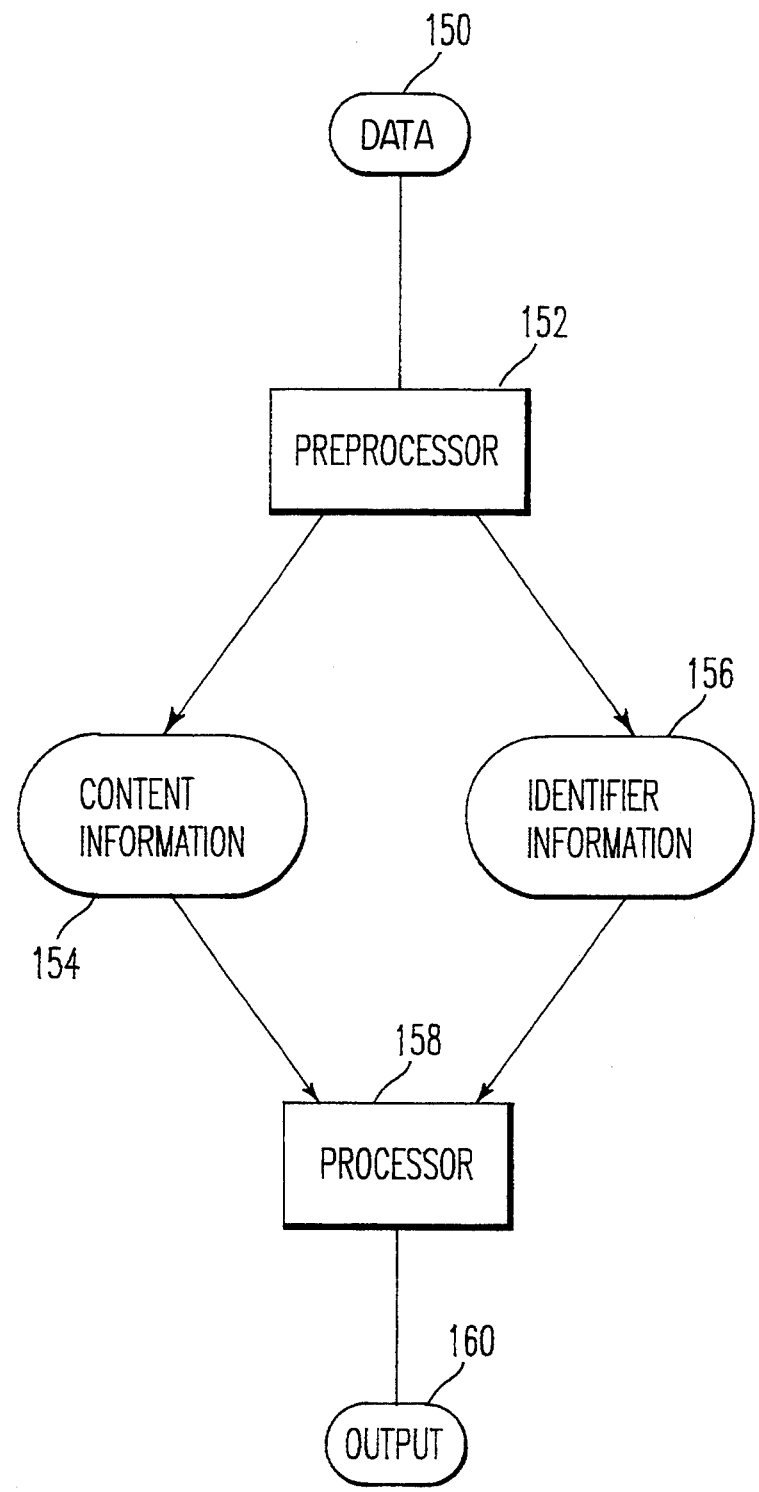
FIG. 9 illustrates the conceptual processors of the present invention.

FIG. 9 is a data flow diagram for the present invention. Data 150 is sent to preprocessor 152 which executes the process illustrated in FIGS. 11–15. Preprocessor 152 keeps track of the nesting of the hierarchical levels, counts the number of bytes being processed, and examines if an end of an indefinite length format routine has been reached. Preprocessor 152 sends the content information 154 to be processed and the identifier information 156 thereof to the processor 158 for processing. The processor 158 can perform, for example, processing of SPDL information into output data 160 such as rasterized image data or postscript commands which can be sent to a printer.

Before the preprocessor 152 performs any functions, data must be received by the preprocessor. This is accomplished through various types of well known communication means and for example could be a system bus connected to the preprocessor 152 or any other type of device, through which information to be processed is sent.

Figure 10:
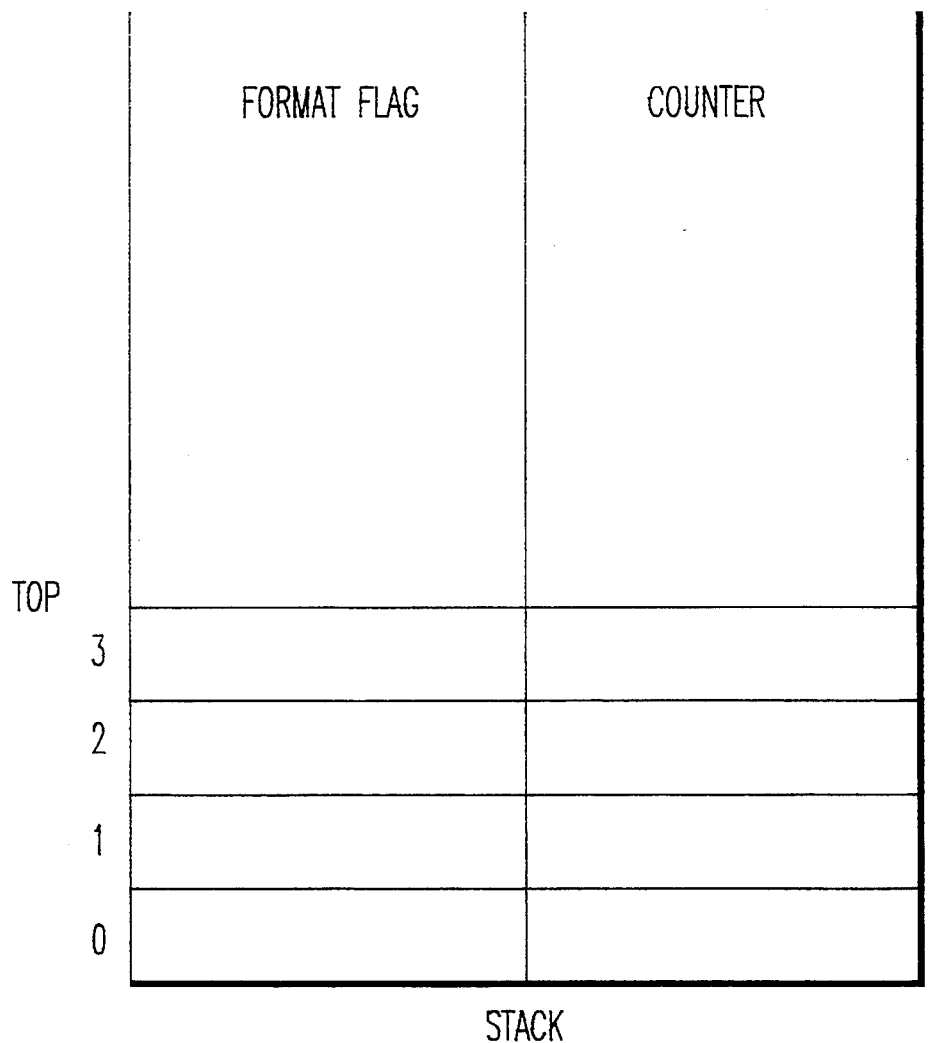
FIG. 10 illustrates a stack structure used by the present invention.

The process of the present invention which keeps track of the nesting of the definite and indefinite length formats can use a stack such as that illustrated in FIG. 10. Each level of the stack contains two entries, one for a format flag and the other for a counter. The format flag contains the value of INDEF when an indefinite length format is being processed and 0 when a definite length format is being processed. The counter is used for keeping track of the number of bytes in an encoding. For a definite length encoding, the counter is set to the number of bytes of the encoding. For the indefinite length encoding, the counter is set to 0.

FIGS. 11A–15 illustrate the encoding used to process nested mixed indefinite and definite length encodings. This process can be executed by and embodied in any type of print server, work station, printer controller or any other type of computing device.

The present invention processes hierarchically encoded information which may have nested definite and indefinite length formats. The information is referred to as being hierarchically constructed because one level of encoding can have other levels of encoding therein. Encoding in a definite length format means that the length of the encoding is stated at the beginning of the data. Encoding in an indefinite length format means that the length of the encoded data is unknown.

Figure 11A:
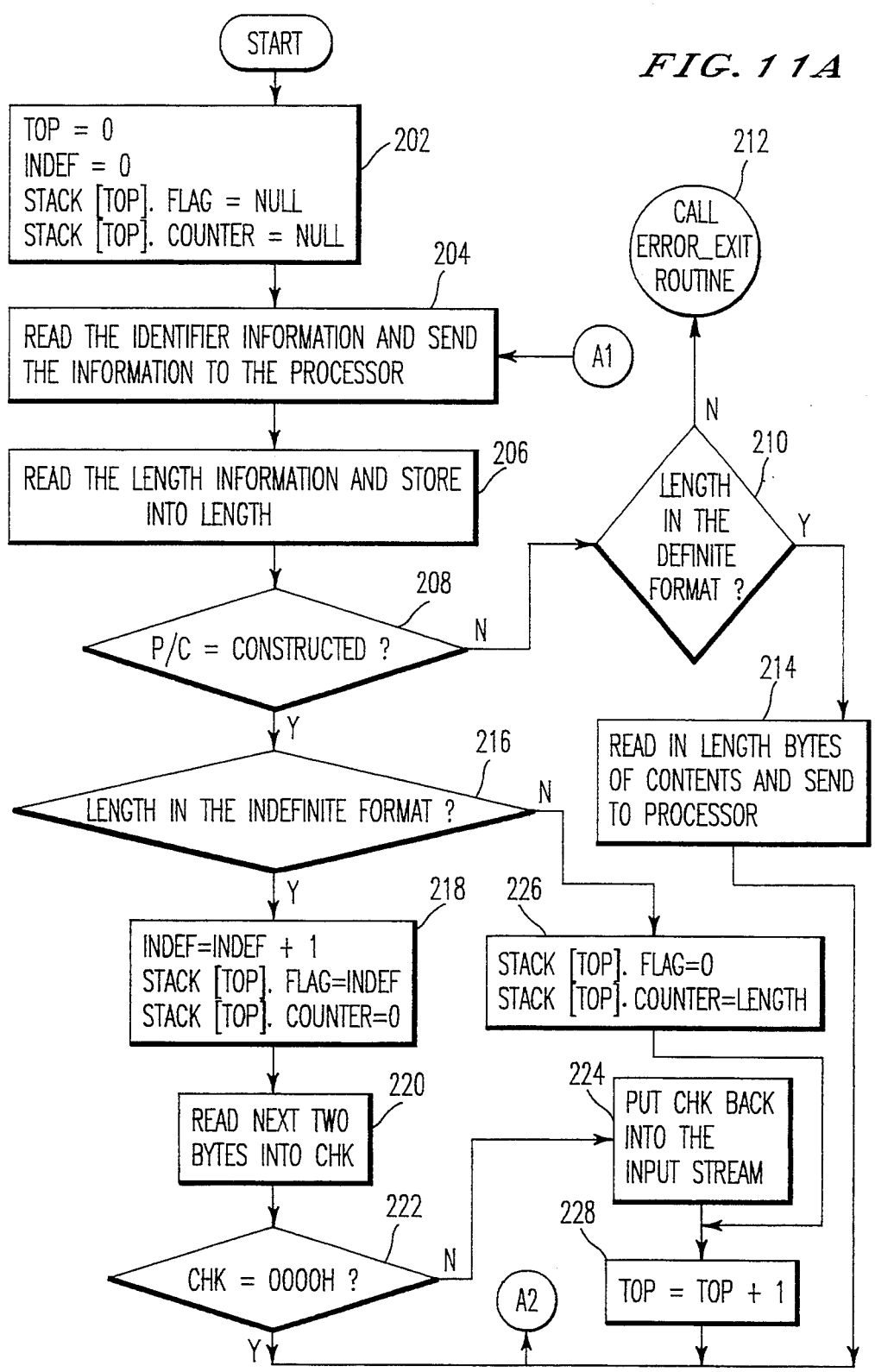
Figure 11B:
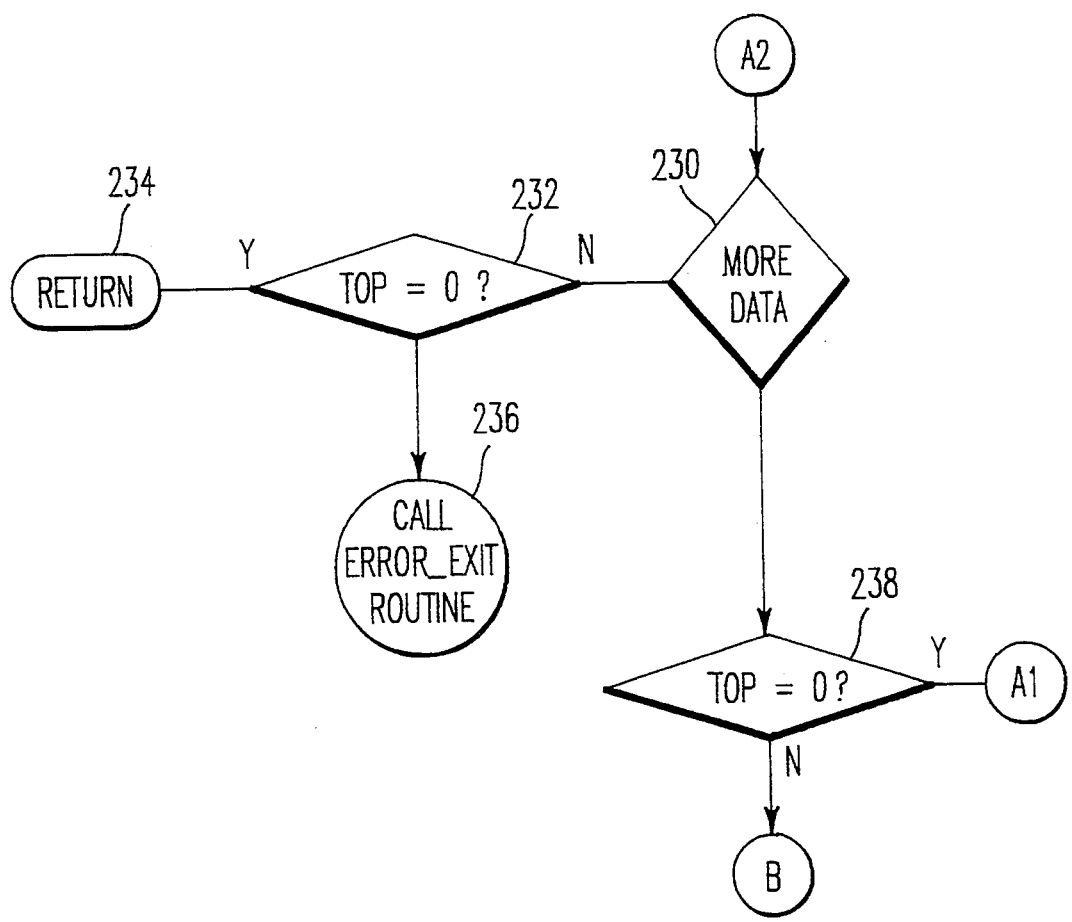

Turning now to the flow charts of FIGS. 11A–15 for a broad overview of the operation of the invention, the process illustrated in FIG. 11A and 11B initializes the variables used by the invention and processes the highest hierarchical level. Note that a detailed description of the flowcharts illustrated in the figures follows this broad overview. If there is one or more hierarchical levels nested within the highest hierarchical level, flow proceeds to process B illustrated in FIG. 12.

Figure 12:
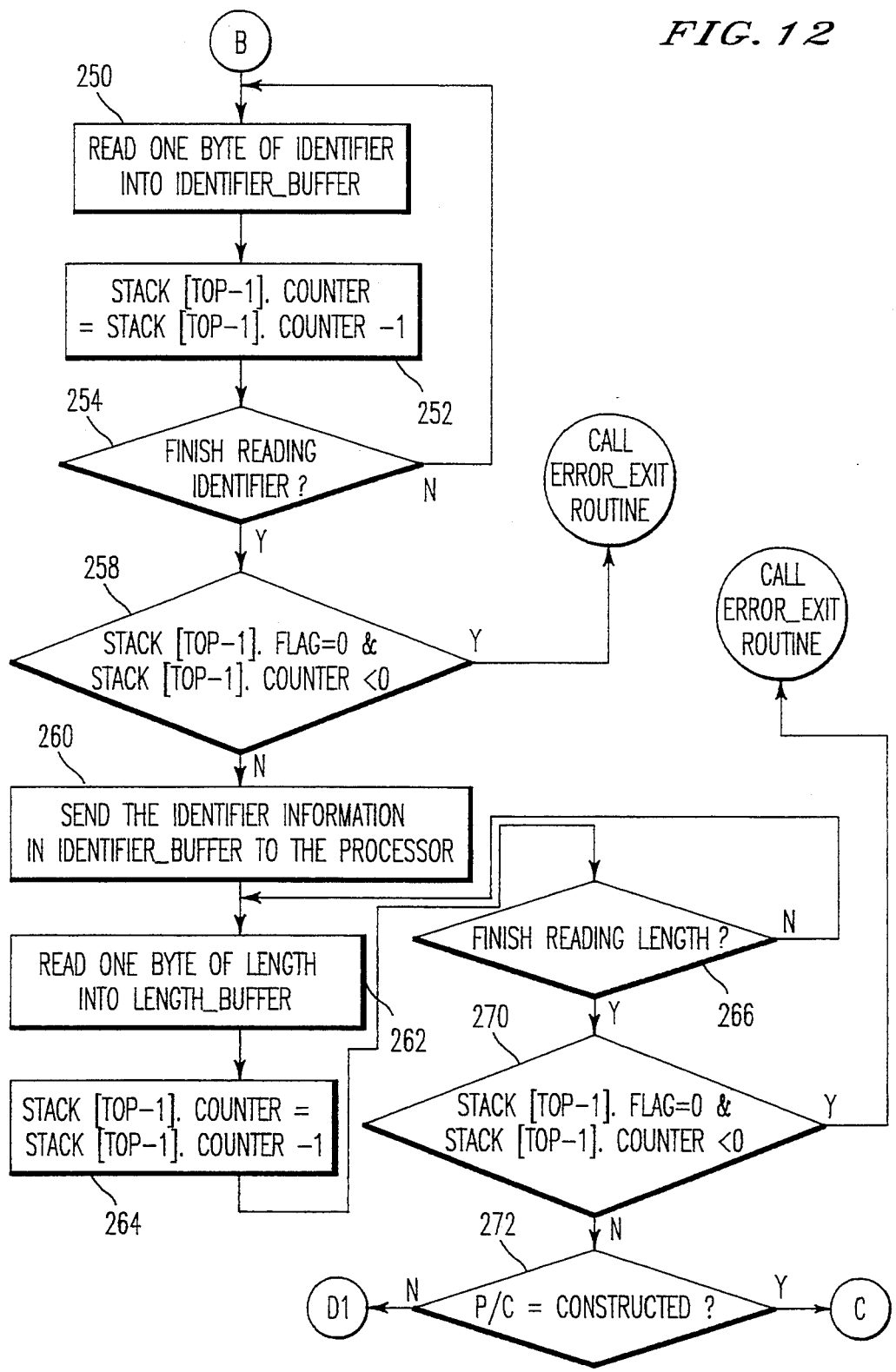
Figure 13:
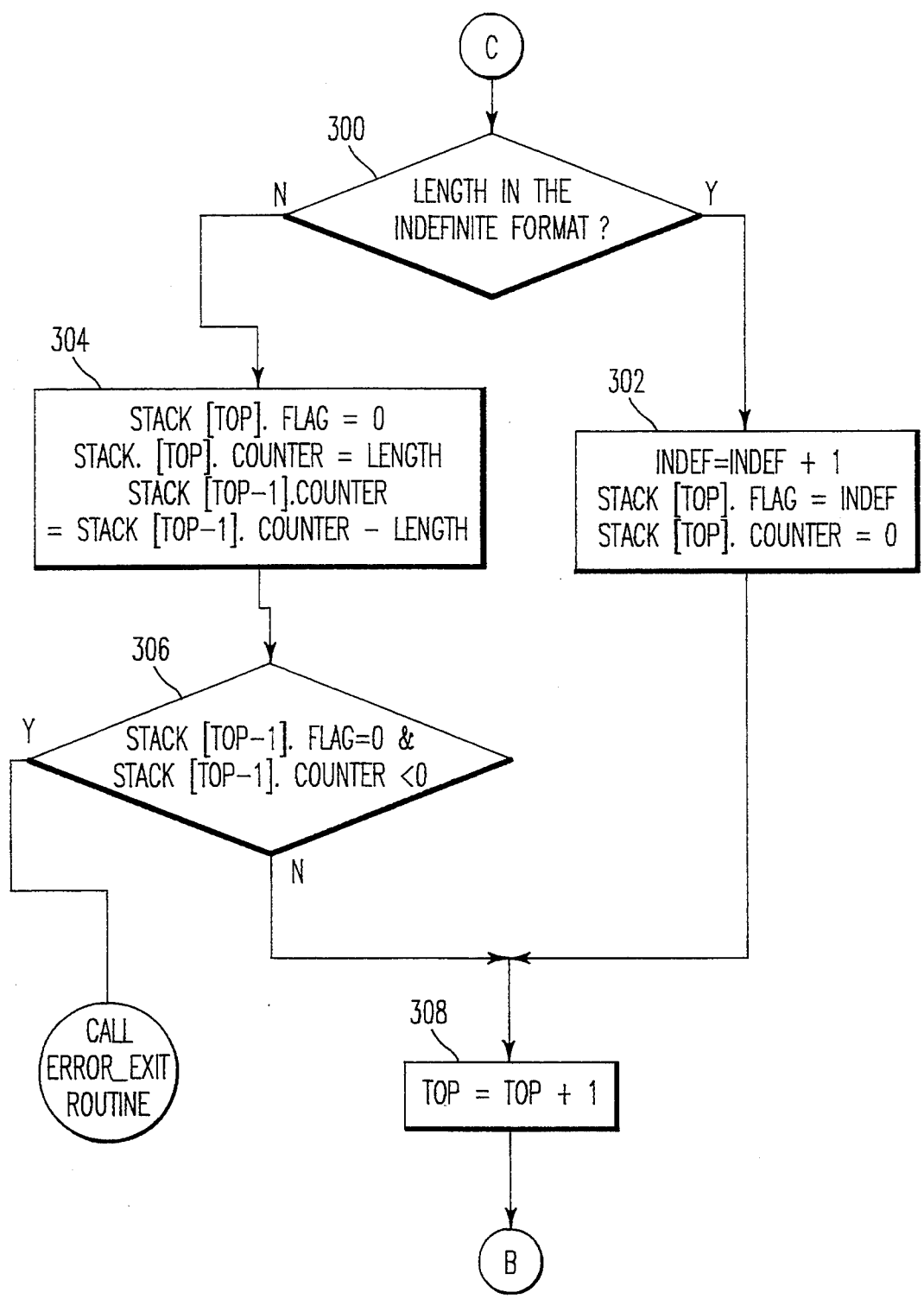

The process illustrated in FIG. 12 analyzes the identifier and length information of nested hierarchical levels. Process C, illustrated in FIG. 13, is called if the nested hierarchical level being processed is constructed and therefore contains additional nested hierarchical levels. If there are no hierarchical levels nested within the hierarchical being processed, the hierarchical level being process is not constructed but considered to be a primitive and flow proceeds to process D1 illustrated in FIG. 14.

Process C, illustrated in FIG. 13, updates the variables necessary for processing a constructed hierarchical level. Process D1, illustrated in FIG. 14, updates variables and processes contents when the hierarchical level is determined to be primitive. A primitive hierarchical level contains no nested hierarchical levels but only contents which need to be processed. During the process D1, if the end of an indefinite length hierarchical level is detected by detecting 0000H, process D3, illustrated in FIG. 15 is called. Process D3 updates the variables used to keep track of the processing when the end of an indefinite length process is determined.

The processes illustrated in FIGS. 11A–15 are called, for example, by the preprocessor 152 illustrated in FIG. 9. The actual processing of the contents is performed by the processor 158. Alternatively, one processor can perform the preprocessing and the actual processing of the contents.

When the process of the present invention is called, step 202 of FIG. 11A initializes variables used to keep track of the processing. The variable TOP holds the next storage position or level to be used in the stack such as the stack illustrated in FIG. 10. TOP is initialized to 0 as information for the first entry in the stack is to be written in level 0. The variable INDEF is used to keep track of the number of indefinite formats within the encoded information being processed and is initialized to 0. The first two entries in the stack, Stack[TOP].FLAG and Stack[TOP].COUNTER, are both initialized to be null as no information is in the stack at the beginning of processing. After initialization in step 202, flow proceeds to step 204 where the identifier information of the encoding is read and sent to the processor 158. If the identifier information is incorrect, the processor 158 stops further processing. Step 206 reads the length information from the encoding and stores the length information into the variable LENGTH.

Step 208 examines whether the first hierarchical level (also referred to as the highest hierarchical level) is primitive or constructed. This information is contained in bit 6 of the identifier octet, as illustrated in FIG. 3, and is from the identifier information previously read in step 204. If the encoding is determined to be primitive, flow proceeds to step 210 for error checking. If the encoding is primitive, there should be no nested hierarchical levels and the length of the encoding is in the definite length format. If step 210 determines that the length is in the definite format, flow proceeds to step 214 to read in LENGTH bytes of contents which are sent to the processor 158 and processed and then flow proceeds to A2 in FIG. 11B. Otherwise, there is an error and an Error_Exit Routine is called in step 212.

As the processor 158 is processing a definite number of bytes such as LENGTH bytes, it is necessary to keep track of the number of bytes processed. One way of doing this is to use Stack[TOP].COUNTER as a byte counter, although the counter can be implemented in any manner.

If the encoding is determined to be constructed in step 208, there is one or more additional hierarchical levels within the first hierarchical level and flow proceeds to step 216 to determine whether the level being processed is in the indefinite length format or the definite length format. If the encoding is in the definite length format, flow proceeds to step 226 where the entries on the top level of the stack are set. The FLAG entry of the stack is set to 0, indicating that the encoding is in a definite length format. The COUNTER entry of the stack is set equal to LENGTH, the length of the definite length format encoding.

If step 216 determines that the length is in the indefinite format, flow proceeds to step 218 where the variable INDEF is incremented by one. INDEF is used to keep track of the number of indefinite length formats being processed and as there is an additional indefinite length hierarchical level, INDEF must be incremented. The entries in the TOP level of the stack are also set in step 218. The FLAG entry is set to the string INDEF, indicating that the level being processed is in the indefinite format. Note that the variable INDEF used to keep track of the number of indefinite encodings being processed is different from the FLAG entry in the stack containing the flag INDEF which indicates that the encoding being processed is in the indefinite format. The COUNTER entry of the stack is set to 0 as the length of the encoding is unknown.

After step 218, steps 220 and 222 are performed to determine if the end flag, 0000H, of an indefinite length encoding has been reached. Step 220 reads the next two bytes of the input data stream into a temporary buffer CHK. Step 222 determines if CHK contains the end of the indefinite length format flag. If it does, flow proceeds to A2 in FIG. 11B. If it does not, step 224 returns the two bytes in CHK back into the input stream.

From steps 224 and 226, flow proceeds to step 228 where the variable TOP is incremented by one. TOP is used to keep track of the top level of the stack and as the top level of the stack has just been used, a new top level of the stack must be set. From step 228, flow proceeds to A2 in FIG. 11B.

In FIG. 11B, step 230 determines if there is more data to be processed. There will be more data if the entire encoding has not been processed. If all information has been processed, TOP should be zero. If step 234 determines that TOP is equal to zero, flow returns to the process which called the processing routines in step 234. If TOP is not equal to zero, there is an error and the ERROR_EXIT routine is called in step 236.

If there is more data in step 230, meaning all encoded information has not been processed, flow proceeds to step 238. In step 238, the variable TOP is examined to determine if it is equal to zero. If it is equal to zero, the next level to be processed is again at the first or highest hierarchical level and flow proceeds back to A1 in FIG. 11A. If TOP is not equal to zero, nested hierarchical levels must be processed and flow proceeds to process B illustrated in FIG. 12.

FIG. 12 performs a preprocessing of the identifier and length information of nested hierarchical levels. Step 250 reads one byte of identifier information into the variable IDENTIFIER_BUFFER. Step 252 decrements the counter at the TOP −1 level of the stack by one. The TOP −1 level of the stack is the highest level of the stack which contains length data. The TOP level of the stack is the next position where information is to be written and is currently empty. From step 252, flow proceeds to step 254 where it is determined whether or not the identifier information has been completely read. If there is additional identifier information, flow proceeds back to step 250 where an additional byte is read into the IDENTIFIER_BUFFER.

If the identifier has been completely read, flow proceeds from step 254 to 258 for error checking. If at the TOP −1 level of the stack, FLAG is equal to zero, a definite length format is being processed and therefore, the COUNTER at the TOP −1 level of the stack must be greater than or equal to zero. If it is not equal to zero, there is an error and an ERROR_EXIT routine is called. This type of error check is performed throughout the processing when it is possible that an error has occurred and will be referred to hereinafter simply as error checking. If there is no error, flow proceeds to step 260 where the identifier information which is stored in the IDENTIFIER_BUFFER is sent to the processor.

Next, the length information of the hierarchical level must be processed. Step 262 reads one byte of the length information into LENGTH_BUFFER. As one byte of the encoding has been read, the byte counter at the TOP −1 level of the stack is decremented by one in step 264. Step 266 examines whether all length information has been read and if it has, flow proceeds to step 270. If it has not been read, flow proceeds back to step 262 for additional reading of length information. After the length information has been read, step 270 performs error checking as described with respect to step 258. If there is no error, flow proceeds to 272 to determine whether the level being processed is constructed or primitive. This is determined from the previously read identifier information. If the encoding being processed is constructed, flow proceeds to process C illustrated in FIG. 13. If the encoding is not constructed but primitive, flow proceeds to process D1 illustrated in FIG. 14.

Process C illustrated in FIG. 13 handles the processing of a constructed encoding. Step 300 determines whether the constructed encoding is in the definite or indefinite length format. If the encoding is in the indefinite format, flow proceeds to step 302 where the variable INDEF is incremented by one, FLAG of the TOP entry of the stack is set to INDEF, indicating the indefinite length format, and COUNTER of the TOP entry of the stack is set to 0. If step 300 determines that the length is in the definite format, flow proceeds to step 304 where FLAG of the TOP level of the stack is set equal to 0, the counter of the TOP level of the stack is set equal to LENGTH, the length of the encoding, and the COUNTER at the TOP −1 level of the stack is reduced by the length of the constructed encoding. Step 306 performs error checking as previously described. From steps 306 and 302, flow proceeds to step 308 where the variable TOP is incremented by 1, which increments the top level of the stack. From step 308, flow proceeds back to process B illustrated in FIG. 12.

Figure 14:
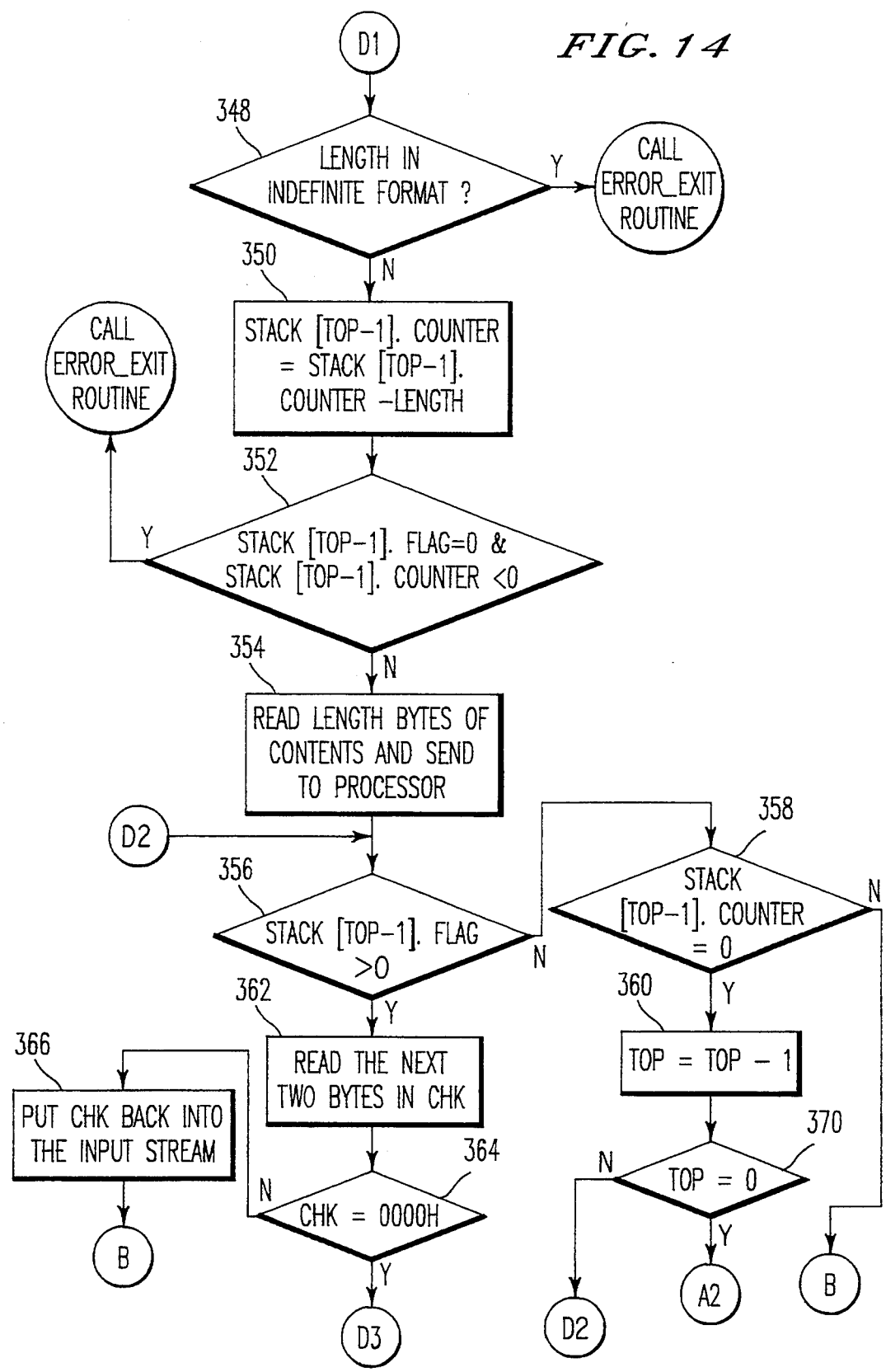
Figure 15:
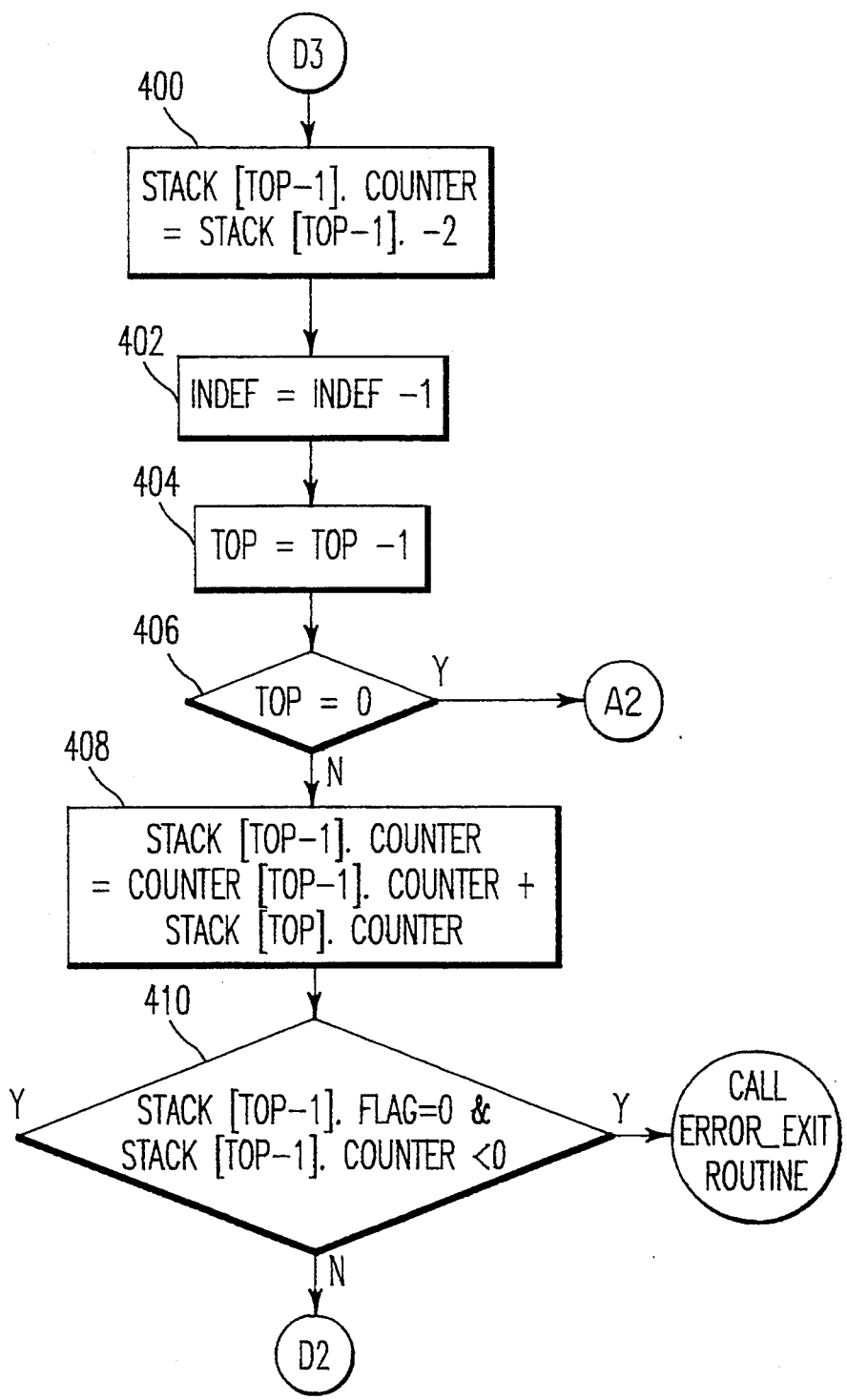

If step 272 of FIG. 12 determines that the encoding being processed is primitive, flow proceeds to process D1 illustrated in FIG. 14. In process D1, step 348 checks the length format. If the length format is indefinite, the ERROR_EXIT routine is called as a primitive encoding must be in the definite length format. If the length format is definite, flow proceeds to step 350. Step 350 decrements the counter of the TOP −1 level of the stack by LENGTH. Step 352 performs error checking and then step 354 reads LENGTH bytes of contents which are sent to the processor 158. As process D1 processes primitive encodings which have a definite length, step 354 reads the LENGTH bytes of the contents which are processed by processor 158. Stack-[TOP].COUNTER can be used as a byte counter as the contents are being processed.

Step 356 then examines the FLAG at the TOP −1 level of the stack. If the FLAG is not greater than zero, the encoding is in the definite length and flow proceeds to step 358 to determine whether the COUNTER at the TOP −1 level of the stack is zero. If the COUNTER is zero, all bytes of the encoding have been processed and the variable TOP is then decremented by 1 in step 360. Then, step 370 examines TOP. If TOP is not equal to zero, flow proceeds to D2; otherwise flow proceeds to process A2 illustrated in FIG. 11B as the hierarchical level being processed has ended. If step 358 determines that the counter at the TOP −1 level of the stack is not equal to 0, there are further hierarchical levels which need to be processed and flow proceeds to process B illustrated in FIG. 12.

If step 356 determines that flag at the TOP −1 level is equal to indefinite, e.g., the FLAG at the TOP −1 level is greater than zero, flow proceeds to step 362 where the next two bytes of the encoding are read into the variable CHK. Step 364 examines whether CHK is equal to 0000H, the encoding which signals the end of an indefinite format encoding. If it is, flow proceeds to process D3 illustrated in FIG. 15. If it is not, the two bytes read in step 362 contain content and therefore, those two bytes are put back into the input data stream in step 366. From step 366, flow proceeds to process B illustrated in FIG. 12 for further processing of the nested encodings.

FIG. 15 illustrates process D3 which handles the processing at the end of indefinite length encoding after the end flag 0000H has been reached. In process D3, step 400 decrements the COUNTER at the TOP −1 level of the stack by 2, as 2 bytes which signal the end of the indefinite encoding flag have been read in step 362 of FIG. 14. As an indefinite length encoding is finished being processed, the variable INDEF used to keep to keep track of the number of indefinite encodings is decremented by 1 in step 402. Step 404 decrements the variable TOP by 1 as the hierarchical level of the indefinite encoding is finished being processed. Step 406 examines the variable TOP to determine if it is equal to 0. If it is zero, the highest hierarchical level is finished being processed and flow proceeds to process A2 illustrated in FIG. 11B. If TOP is determined not to be 0 in step 406, flow proceeds to step 408 where the COUNTER at the TOP −1 level of the stack is set equal to the COUNTER at the TOP −1 level of the stack plus the COUNTER at the TOP level of the stack. From step 408, flow proceeds to step 410 where error checking is performed and if no errors are determined, flow proceeds to step D2 of FIG. 14.

The processing of the encoding illustrated in FIG. 1 will now be described with respect to the processes illustrated in the flowcharts of FIGS. 11A–15. Processing starts in FIG. 11A with initialization in step 202 and flow proceeds to step 208 where the encoding of the first hierarchical level (steps 1–16) is determined to be constructed. Step 216 determines that the length is in the definite format and therefore, flow proceeds to step 226 where the FLAG at the TOP level of the stack is set equal to 0 and the COUNTER at the TOP level of the stack is set equal to the LENGTH (400 bytes). From step 226, flow proceeds to step 228 where the variable TOP is incremented from 0 to 1. Program steps 1–3 illustrated in FIG. 1 have now been processed and the variable TOP is set equal to 1, INDEF is equal to 0, and the stack contains one level with 0 for the FLAG and 400 for the COUNTER, as illustrated in processing step A of FIG. 16A.

Step 230 determines that there is more data and step 238 determines that TOP is equal to 1 and therefore, flow proceeds to process B illustrated in FIG. 12. Step 250 of FIG. 12 reads the identifier at program step 4 and decrements the counter at the TOP −1 level of the stack by 1. As the identifier is 2 bytes, step 254 determines that another byte of the identifier must be read and flow proceeds back to step 250 to read the additional byte of the identifier information. Step 252 decrements the COUNTER at the TOP −1 level of the stack by 1 from 399 to 398 and step 254 determines that the identifier information is finished being read. The variables at this point are illustrated in processing step B of FIG. 16A.

Flow proceeds down to step 262 where the length information of step 5 is processed. One byte of length information is read and therefore the counter in the stack is decremented to 397. The variables at this point are illustrated in processing step C of FIG. 16A.

Step 272 determines that the encoding being processed (the encoding beginning at program step 4) is constructed and therefore, flow proceeds to process C illustrated in FIG. 13. The length is in the indefinite format and therefore in FIG. 13, flow proceeds from step 300 to 302 where the variable INDEF is incremented by 1 and the FLAG at the TOP level of the stack is set equal to INDEF and the COUNTER at the TOP level of the stack is set equal to 0. Step 308 then increments TOP by 1 and the variables are as illustrated in processing step D.

Flow proceeds back to process B of FIG. 12 for processing the identifier at step 7 of the encoding of FIG. 1. At the end of step 260 of FIG. 12, the variable TOP is equal to 2, INDEF is equal to 1, and the stack is as illustrated in processing step E.

Next, the identifier information at step 8 of FIG. 1 is processed and after it is processed, the variables at step 272 are as illustrated in processing step F.

From step 272, the encoding of lines 7-9 is determined to be primitive and therefore flow proceeds to step D1 illustrated in FIG. 14. In FIG. 14, flow proceeds from step 350 to steps 352, 354, 356, 362 and 364. Step 364 examines the two bytes after the end of the contents of program step 9 of FIG. 1 and determines that they are not equal to 0000H. Therefore, those two bytes, corresponding to the identifier at step 10, are put back into the data stream and flow proceeds to process B illustrated in FIG. 12 to process the identifier and contents of program lines 10-12. At this point, the variables are as illustrated at processing step G of FIG. 16A.

The identifier information at program step 10 is processed and at step 260 of FIG. 12, the variables are as illustrated for processing step H. Next, the length information of program step 11 of FIG. 1 is processed and at step 272 of FIG. 12, the variables are as illustrated in processing step I of FIG. 16A.

Step 272 of FIG. 12 determines that the encoding is primitive and flow proceeds to process D1 illustrated in FIG. 14. The 40 bytes of contents are processed in steps 350-354 and after step 354, the variables are as illustrated in processing step J of FIG. 16B.

Step 356 then determines that the FLAG at the TOP −1 level of the stack is greater than zero and flow proceeds to steps 362 and 364 where the next two bytes are examined to determine if they are equal to 0000H. As the bytes are equal to 0000H, indicating an end to the indefinite encoding, from step 364, flow proceeds to process D3 illustrated in FIG. 15. At the end of process D1 of FIG. 14, the variables are as illustrated at processing step K of FIG. 16B.

At step 400, the COUNTER at the TOP −1 level of the stack is decremented by 2 as illustrated in processing step L in FIG. 15. Flow proceeds to steps 402, 404, 406, 408, and to 410 and then to process D2 illustrated in FIG. 14. At this point, the variables are as illustrated at processing step M of FIG. 16B.

In process D2, step 356 examines the FLAG at the TOP −1 level to determine if it is greater than 0. As the variable TOP was decremented by 1 in step 404 of FIG. 15, step 356 determines that the FLAG at the TOP −1 level is not greater than 0 in step 356 and flow proceeds to step 358. Step 358 determines that the COUNTER at the TOP −1 level of the stack is not equal to 0 and therefore, flow proceeds to process B illustrated in FIG. 12. The variables are now as illustrated in processing step N of FIG. 16B.

The identifier information at program step 14 of FIG. 1 is processed at steps 250-260 of FIG. 12. The variables are now as illustrated in step O of FIG. 16B.

The length information of program step 15 is now processed in step 260 to step 266 and the variables are now as illustrated in processing step P of FIG. 16B.

Step 272 of FIG. 12 then determines that the encoding being processed is primitive and therefore flow proceeds to process D1 illustrated in FIG. 14. Steps 350-354 of FIG. 14 processes the 100 bytes of content at program step 16 of FIG. 1 and the variables are as illustrated in processing step Q of FIG. 16B.

After step 354, step 356 determines that the FLAG at the TOP −1 level of the stack is not greater than 0 and flow proceeds to step 358 where the COUNTER is examined to determine if it is equal to 0 at the TOP −1 level of the stack. As it is, flow proceeds to step 360 where the variable TOP is decremented by 1 and the variables are now as illustrated in processing step Q of FIG. 16B.

Flow proceeds to process A2 illustrated in FIG. 11B and step 238 determines that there is more data, corresponding to programming steps 17-19 of FIG. 1. From step 238, flow proceeds to process A1 of FIG. 11A and to steps 204, 206, and 208. Step 208 determines that the encoding is primitive and therefore the contents at programming step 19 are processed in step 214. Flow proceeds to step 230 of FIG. 11B where it is determined that there is no more data, step 232 determines that TOP is equal to zero and flow returns to the processor which called the process illustrated in FIGS. 11A-15. The variables are now as illustrated in processing step R of FIG. 16b.

The present invention has been described using a stack and a variable TOP to keep track of the number of levels in the stack. The example shown in this disclosure uses an array and an index TOP to implement a stack. However, the function performed by the stack can be implemented with a linked list in a known manner. Further, in place of the stack, any type of storage buffer could be used to keep track of the variables used during processing.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. An apparatus for processing mixed definite length and indefinite length encodings, comprising:
  a communication means for receiving a document data stream having mixed definite length and indefinite length encodings, both of which have preamble and content information;
  a processing means, connected to the communication means, for processing the document data stream having mixed definite length and indefinite length encodings; and
  a temporary storage means, connected to the processing means, for storing the preamble information of the definite length and indefinite length encodings as the processing means is processing the document data stream, wherein the temporary storage means comprises:

a stack for storing length information contained in the preamble information of the definite length encoding.

2. An apparatus according to claim 1, wherein a top entry of the stack is for storing the length information of the definite length encoding, and as the definite length encoding is being processed, the processing means decrements the top entry in the stack by the number of bytes of the definite length encoding which have been processed.

3. A method of processing an indefinite length encoding having at least one definite length encoding nested therein, wherein both the indefinite length encoding and the at least one definite length encoding contain preamble information and content information, comprising the sequential steps of:

(A) processing a portion of bytes of the indefinite length encoding;

(B) processing bytes of said at least one definite length format encoding nested therein;

(C) processing bytes of said indefinite length encoding which have not been processed in step (A).

4. A method according to claim 3, wherein step (B) further comprises the substeps of:

pushing a length of the definite length encoding onto a stack; and as the definite length encoding is being processed, decrementing the length of the definite length encoding on the stack by a number of bytes of the definite length encoding which have been processed.

5. A method according to claim 3, wherein step (B) further comprises the substeps of:

storing a length of the definite length encoding in a temporary storage device; and as the definite length encoding is being processed, decrementing the length of the definite length encoding in the temporary storage buffer by a number of bytes of the definite length encoding which have been processed.

6. A method of processing an indefinite length encoding having a definite length encoding nested therein, both the indefinite length encoding and the definite length encoding containing preamble information and content information, comprising the steps:

processing the preamble information of the indefinite length encoding;

processing the content information of the indefinite length encoding which contains the definite length encoding, by performing the steps:

processing the preamble information of the definite length encoding to determine a number of bytes of content information of the definite encoding, and;

processing the content information of the definite length encoding by processing bytes until the number of the bytes of the content information of the encoding have been processed without determining whether a marker indicating an end of the indefinite length encoding exists in the encoding;

examining bytes of the indefinite length encoding after the content information of the definite length encoding for a marker indicating an end of the indefinite length encoding, after processing the content information of the definite length encoding; and terminating the processing of the indefinite length encoding if bytes after the content information of the definite length encoding indicate an end of the indefinite length encoding.

7. A method according to claim 6, further comprising the step:

processing the bytes subsequent to the definite length encoding as a subsequent nested procedure within the indefinite length encoding if the bytes subsequent to the content information of the definite length encoding do not indicate an end of the indefinite length encoding.

8. A method of processing an indefinite length encoding having a definite length encoding nested therein, both the indefinite length encoding and the definite length encoding containing preamble information and content information, comprising the steps:

processing the preamble information of the indefinite length encoding;

processing the content information of the indefinite length encoding which contains the definite length encoding, by performing the steps:

processing preamble information of the definite length encoding to determine a number of bytes of content information of the definite encoding, and storing the number of bytes of the content information of the definite encoding in a temporary storage means, and;

processing the content information of the definite length encoding by processing bytes until the number of bytes of content information stored in the temporary storage means have been processed without determining whether a marker indicating an end of the indefinite length encoding exists in the encoding, and as the content information of the definite length encoding is being processed, counting in said temporary storage means, the number of bytes of the definite length encoding which have been processed;

examining bytes of the encoding after the content information of the definite length encoding for bytes indicating an end of the indefinite length encoding, after processing the content information of the definite length encoding; and terminating the processing of the indefinite length encoding if bytes subsequent to the contents of the definite length encoding indicate an end of the indefinite length encoding.

9. A method according to claim 8, wherein the step of storing the number of bytes of the content information of the definite length encoding pushes the length information onto a stack; and the step of processing the content information of the definite length encoding processes bytes until the number of bytes of content on the stack have been processed without determining whether a marker indicating an end of the indefinite length encoding exists in the encoding, and as the content information of the definite length encoding is being processed, counting in said stack, the number of bytes of the definite length encoding which have been processed.

10. A method of processing a first definite length encoding having an indefinite length encoding nested therein, the indefinite length encoding having nested therein a second definite length encoding, the indefinite length encoding and the first and second definite length encodings each containing preamble information and content information, comprising the steps:

processing the preamble information of the first definite length encoding;

processing the content information of the first definite length encoding by performing the steps:

processing the preamble information of the indefinite length encoding and as the preamble information of the indefinite length encoding is being processed, counting in a first entry in a storage means, the number of bytes of the preamble information of the indefinite length encoding which have been processed;

processing the content information of the indefinite length encoding, by performing the steps:

processing the preamble information of the second definite length encoding to determine a number of bytes of the content information of the second definite length encoding and storing in a second entry of the temporary storage means, the number of bytes of the content information of the second definite length encoding, and as the preamble information of the second definite length encoding is being processed, counting in the first entry of the temporary storage means, the number of bytes of the second definite length encoding which have been processed, and;

processing the content information of the second definite length encoding by processing the second definite length encoding until the number of bytes of content information of the second definite length encoding have been processed without determining whether a marker indicating an end of the indefinite length encoding exists in the encoding, and as the content information of the second definite length encoding is being processed, counting in said second entry of the temporary storage means, the number of bytes of the definite length encoding which have been processed;

examining bytes of the encoding after the content information of the second definite length encoding for bytes indicating an end of the indefinite length encoding, after processing the content information of the second definite length encoding;

terminating the processing of the indefinite length encoding, if bytes subsequent to the content information of the second definite length encoding indicate an end of the indefinite length encoding; and processing subsequent bytes of content of the first definite length encoding until all bytes of the first definite length encoding have been processed.

11. An apparatus for processing mixed definite length and indefinite length encodings, comprising:

a communication means for receiving a document data stream having mixed definite length and indefinite length encodings, both of which have preamble and content information;

a processing means, connected to the communication means, for processing the document data stream having mixed definite length and indefinite length encodings and for processing an SPDL document data stream; and a temporary storage means, connected to the processing means, for storing the preamble information of the definite length and indefinite length encodings as the processing means is processing the document data stream.

12. A system for processing an indefinite length encoding having a definite length encoding nested therein, both the indefinite length encoding and the definite length encoding containing preamble information and content information, comprising:

means for processing the preamble information of the indefinite length encoding;

means for processing the content information of the indefinite length encoding which contains the definite length encoding, including:

means for processing the preamble information of the definite length encoding to determine a number of bytes of content information of the definite encoding; and means for processing the content information of the definite length encoding by processing bytes until the number of the bytes of the content information of the encoding have been processed without determining whether a marker indicating an end of the indefinite length encoding exists in the encoding;

means for examining bytes of the indefinite length encoding after the content information of the definite length encoding for a marker indicating an end of the indefinite length encoding, after processing the content information of the definite length encoding; and means for terminating the processing of the indefinite length encoding if bytes after the content information of the definite length encoding indicate an end of the indefinite length encoding.

13. A system according to claim 12, further comprising:

means for processing the bytes subsequent to the definite length encoding as a subsequent nested procedure within the indefinite length encoding if the bytes subsequent to the content information of the definite length encoding do not indicate an end of the indefinite length encoding.

14. A system for processing an indefinite length encoding having a definite length encoding nested therein, both the indefinite length encoding and the definite length encoding containing preamble information and content information, comprising:

means for processing the preamble information of the indefinite length encoding;

means for processing the content information of the indefinite length encoding which contains the definite length encoding, including:

means for processing preamble information of the definite length encoding to determine a number of bytes of content information of the definite encoding, and storing the number of bytes of the content information of the definite encoding in a temporary storage means; and means for processing the content information of the definite length encoding by processing bytes until the number of bytes of content information stored in the temporary storage means have been processed without determining whether a marker indicating an end of the indefinite length encoding exists in the encoding, and as the content information of the definite length encoding is being processed, counting in said temporary storage means, the number of bytes of the definite length encoding which have been processed;

means for examining bytes of the encoding after the content information of the definite length encoding for bytes indicating an end of the indefinite length encoding, after processing the content information of the definite length encoding; and means for terminating the processing of the indefinite length encoding if bytes subsequent to the contents of the definite length encoding indicate an end of the indefinite length encoding.

15. A method according to claim 14, wherein the means for storing the number of bytes of the content information of the definite length encoding pushes the length information onto a stack; and the means for processing the content information of the definite length encoding processes bytes until the number of bytes of content on the stack have been processed without determining whether a marker indicating an end of the indefinite length encoding exists in the encoding, and as the content information of the definite length encoding is being processed, counting in said stack, the number of bytes of the definite length encoding which have been processed.

16. A system for processing a first definite length encoding having an indefinite length encoding nested therein, the indefinite length encoding having nested therein a second definite length encoding, the indefinite length encoding and the first and second definite length encodings each containing preamble information and content information:

means for processing the preamble information of the first definite length encoding;

means for processing the content information of the first definite length encoding including:

means for processing the preamble information of the indefinite length encoding and as the preamble information of the indefinite length encoding is being processed, counting in a first entry in a storage means, the number of bytes of the preamble information of the indefinite length encoding which have been processed;

means for processing the content information of the indefinite length encoding, including:

means for processing the preamble information of the second definite length encoding to determine a number of bytes of the content information of the second definite length encoding and storing in a second entry of the temporary storage means, the number of bytes of the content information of the second definite length encoding, and as the preamble information of the second definite length encoding is being processed, counting in the first entry of the temporary storage means, the number of bytes of the second definite length encoding which have been processed; and means for processing the content information of the second definite length encoding by processing the second definite length encoding until the number of bytes of content information of the second definite length encoding have been processed without determining whether a marker indicating an end of the indefinite length encoding exists in the encoding, and as the content information of the second definite length encoding is being processed, counting in said second entry of the temporary storage means, the number of bytes of the definite length encoding which have been processed;

means for examining bytes of the encoding after the content information of the second definite length encoding for bytes indicating an end of the indefinite length encoding, after processing the content information of the second definite length encoding;

means for terminating the processing of the indefinite length encoding, if bytes subsequent to the content information of the second definite length encoding indicate an end of the indefinite length encoding; and means for processing subsequent bytes of content of the first definite length encoding until all bytes of the first definite length encoding have been processed.

* * * * *

UNITED STATES PATENT AND TRADEMARK OFFICE
CERTIFICATE OF CORRECTION

PATENT NO. : 5,436,627
DATED : July 25, 1995
INVENTOR(S) : Tetsuro MOTOYAMA, et al.

It is certified that error appears in the above-indentified patent and that said Letters Patent is hereby corrected as shown below:

On the title page, Item [63], the Related U.S. Application Data should read:

--Continuation-in-part of Ser. No. 931,808, Aug. 11, 1992, Pat. No. 5,416,896, which is a continuation-in-part of Ser. No. 876,601 Apr. 30, 1992, Pat. No. 5,319,748, and Ser. No. 876,251, Apr. 30, 1992, Pat. No. 5,325,484.--

In Column 1, Line 16, the Patent Number should read:

----5,319,748--

Signed and Sealed this

Seventeenth Day of October, 1995

Attest:

Attesting Officer

BRUCE LEHMAN

Commissioner of Patents and Trademarks